United States Patent
Sato et al.

(10) Patent No.: US 10,402,606 B2
(45) Date of Patent: Sep. 3, 2019

(54) DEVICE, METHOD, AND PROGRAM MANAGING RFID DATA BASED ON ENVIRONMENTAL TEMPERATURE

(71) Applicant: OMRON Corporation, Kyoto (JP)

(72) Inventors: Takahiro Sato, Otsu (JP); Koji Takatori, Moriyama (JP); Hidekatsu Nogami, Kusatsu (JP); Ryo Ikeuchi, Kusatsu (JP); Takema Sato, Kusatsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/842,894

(22) Filed: Dec. 15, 2017

(65) Prior Publication Data
US 2018/0268179 A1 Sep. 20, 2018

(30) Foreign Application Priority Data
Mar. 14, 2017 (JP) .................. 2017-048614

(51) Int. Cl.
*G06K 7/10* (2006.01)
*G06K 19/07* (2006.01)

(52) U.S. Cl.
CPC ..... *G06K 7/10366* (2013.01); *G06K 19/0723* (2013.01)

(58) Field of Classification Search
CPC ................ G06K 19/0723; G06K 7/10366
USPC ........................................ 235/451
See application file for complete search history.

(56) References Cited

U.S. PATENT DOCUMENTS

| | | | |
|---|---|---|---|
| 9,990,964 B1* | 6/2018 | Lee ......................... | G11C 7/04 |
| 2005/0207049 A1* | 9/2005 | Ikeda ................. | G11B 5/59633 360/31 |
| 2012/0278676 A1* | 11/2012 | Teraura ............... | G06F 11/1489 714/746 |

FOREIGN PATENT DOCUMENTS

| | | |
|---|---|---|
| JP | 2005228026 | 8/2005 |
| JP | 2011227756 | 11/2011 |
| JP | 2012069733 | 4/2012 |

\* cited by examiner

*Primary Examiner* — Toan C Ly
(74) *Attorney, Agent, or Firm* — JCIPRNET

(57) ABSTRACT

An RFID data management device includes an RFID data acquisition unit acquiring RFID management data including identification information of an RFID, a relevant data acquisition unit acquiring RFID relevant data including a use start date of the RFID, and a remaining time calculation unit calculating a remaining data guarantee time of the RFID using a data guarantee period dependent on the identification information and the environmental temperature of the RFID, and the environmental temperature. The remaining time calculation unit calculates the remaining time using an environmental temperature in a first period from a manufacturing date of the RFID to a use start timing, a data guarantee period according to the environmental temperature in the first period, an environmental temperature in a second period from the use start timing to a timing of confirmation, and a data guarantee period according to the environmental temperature in the second period.

16 Claims, 9 Drawing Sheets

| Serial number | Mode | Manufacturing date | Number of reads | Activation date |
|---|---|---|---|---|
| 12345 | ABC | 2015/01/01 | 1 | 2015/05/30 |
| 34567 | DEF | 2015/02/15 | 2 | 2015/05/30 |
| 45678 | GHI | 2015/03/30 | 0 | – |
| ⋮ | ⋮ | ⋮ | ⋮ | ⋮ |

DEVICE, METHOD, AND PROGRAM MANAGING RFID DATA BASED ON ENVIRONMENTAL TEMPERATURE

CROSS-REFERENCE TO RELATED APPLICATION

This application claims the priority benefit of Japanese application serial no. 2017-048614, filed on Mar. 14, 2017. The entirety of the above-mentioned patent application is hereby incorporated by reference herein and made a part of this specification.

BACKGROUND

Technical Field

The technical field relates to a technology for managing data of RFID that is used in a special temperature environment such as a manufacturing line.

Description of Related Art

A method of monitoring stress on a device or the like in a temperature environment more severe than usual of a manufacturing line or the like has been devised. For example, in a method of Japanese Unexamined Patent Application Publication No. 2011-227756, a temperature sensor is mounted on a target device, and stress on the target device is counted according to the temperature detected by the temperature sensor.

An electronic component that is not intended for use under such a severe temperature environment includes an electronic tag including an RFID (RFID tag). The RFID includes an IC chip and an antenna, and various types of data such as a serial number can be stored in the IC chip. Therefore, the RFID is widely used for management of articles on which the RFID tag is mounted.

In a method of Japanese Unexamined Patent Application Publication No. 2005-228026, physical distribution information on an article on which an RFID is mounted is stored in an RFID. A management device performs management of an article by reading the physical distribution information of the RFID.

In a method of Japanese Unexamined Patent Application Publication No. 2012-69733, an RFID is mounted on a tool. In the RFID, an operation history of the tool is stored. A management device performs management of the tool by reading the operation history of the RFID.

However, in the RFID, written data is deleted or corrupted due to a thermal history in a long period. A period from writing of data to this RFID to occurrence of the change in the data is called a retention period.

In particular, in a high-temperature environment, the retention period becomes shorter than that in a general temperature environment such as 25° C. Therefore, when the same management as in a general temperature environment is performed, a change in data occurs and accurate data originally written to the RFID cannot be read.

SUMMARY

According to a first aspect of the disclosure, an RFID data management device includes an RFID data acquisition unit, a relevant data acquisition unit, and a remaining time calculation unit. The RFID data acquisition unit acquires RFID management data including identification information of an RFID. The relevant data acquisition unit acquires RFID relevant data including a use start date of the RFID. The remaining time calculation unit calculates a remaining data guarantee time of the RFID using a data guarantee period dependent on the identification information and the environmental temperature of the RFID, and the environmental temperature. In this case, the remaining time calculation unit calculates the remaining time using an environmental temperature of the RFID in a first period from a manufacturing date of the RFID to a use start timing, and a data guarantee period according to the environmental temperature of the RFID in the first period, and an environmental temperature of the RFID in a second period from the use start timing to a timing of confirmation of the remaining data guarantee time, and a data guarantee period according to the environmental temperature of the RFID in the second period when a data guarantee confirmation timing of the RFID is after a use start timing of the RFID.

According to a second aspect of the disclosure, an RFID data management method is provided, wherein a data processing device executes: an RFID data acquisition step of acquiring RFID management data including identification information of an RFID; a relevant data acquisition step of acquiring RFID relevant data including a use start date of the RFID; and a remaining time calculation step of calculating a remaining data guarantee time of the RFID using a data guarantee period dependent on the identification information and an environmental temperature of the RFID, and the environmental temperature, wherein the remaining time calculation step includes calculating the remaining time using the environmental temperature of the RFID in a first period from a manufacturing date of the RFID to a use start timing, and the data guarantee period according to the environmental temperature of the RFID in the first period, and the environmental temperature of the RFID in a second period from the use start timing to a timing of confirmation of the remaining data guarantee time, and the data guarantee period according to the environmental temperature of the RFID in the second period.

According to a third aspect of the disclosure, an RFID data management program that causes a data processing device to execute a process is provided. The RFID data management program includes: an RFID data acquisition process of acquiring RFID management data including identification information of an RFID; a relevant data acquisition process of acquiring RFID relevant data including a use start date of the RFID; and a remaining time calculation process of calculating a remaining data guarantee time of the RFID using a data guarantee period dependent on the identification information and an environmental temperature of the RFID, and the environmental temperature, wherein, in the remaining time calculation process, the remaining time is calculated using the environmental temperature of the RFID in a first period from a manufacturing date of the RFID to a use start timing, and the data guarantee period according to the environmental temperature of the RFID in the first period, and the environmental temperature of the RFID in a second period from the use start timing to a timing of confirmation of the remaining data guarantee time, and the data guarantee period according to the environmental temperature of the RFID in the second period.

DESCRIPTION OF THE EMBODIMENTS

The disclosure provides an RFID data management technology for accurately calculating a retention period.

According to one embodiment of the disclosure, an RFID data management device includes an RFID data acquisition unit, a relevant data acquisition unit, and a remaining time calculation unit. The RFID data acquisition unit acquires RFID management data including identification information of an RFID. The relevant data acquisition unit acquires RFID relevant data including a use start date of the RFID. The remaining time calculation unit calculates a remaining data guarantee time of the RFID using a data guarantee period dependent on the identification information and the environmental temperature of the RFID, and the environmental temperature. In this case, the remaining time calculation unit calculates the remaining time using an environmental temperature of the RFID in a first period from a manufacturing date of the RFID to a use start timing, and a data guarantee period according to the environmental temperature of the RFID in the first period, and an environmental temperature of the RFID in a second period from the use start timing to a timing of confirmation of the remaining data guarantee time, and a data guarantee period according to the environmental temperature of the RFID in the second period when a data guarantee confirmation timing of the RFID is after a use start timing of the RFID.

In this configuration, the remaining data guarantee time of the RFID is calculated using an environmental temperature before use start (first period) and an environmental temperature after the use start (second period).

Further, in the RFID data management device of the disclosure, the remaining time calculation unit calculates the remaining time using a reduction rate of the data guarantee period based on the environmental temperature.

In this configuration, the remaining time is calculated using the amount of reduction per week, the amount of reduction of the remaining time per month, or the like.

Further, the RFID data management device of the disclosure includes a temperature measurement unit that measures the environmental temperature. The remaining time calculation unit calculates the remaining time using the environmental temperature measured by the temperature measurement unit.

In this configuration, the remaining time is calculated at an actual use temperature.

Further, in the RFID data management device of the disclosure, the environmental temperature is a highest temperature according to each environment.

In this configuration, the remaining time is calculated in a shortest time that is conceivable.

According to the disclosure, it is possible to accurately calculate the retention period of the RFID.

Figure 1:
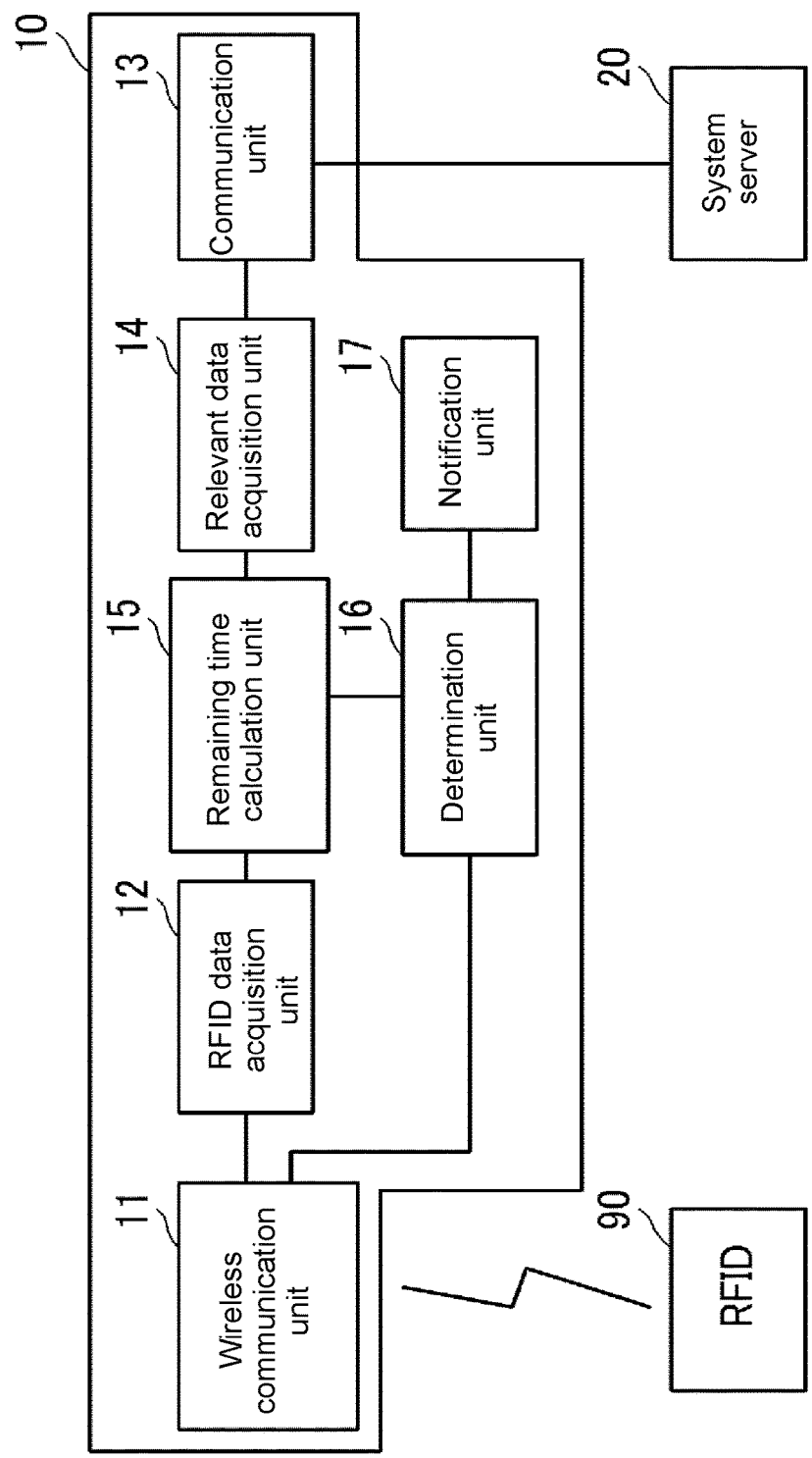
FIG. 1 is a diagram illustrating functional blocks of an RFID data management device according to a first embodiment of the disclosure.
Figure 2:
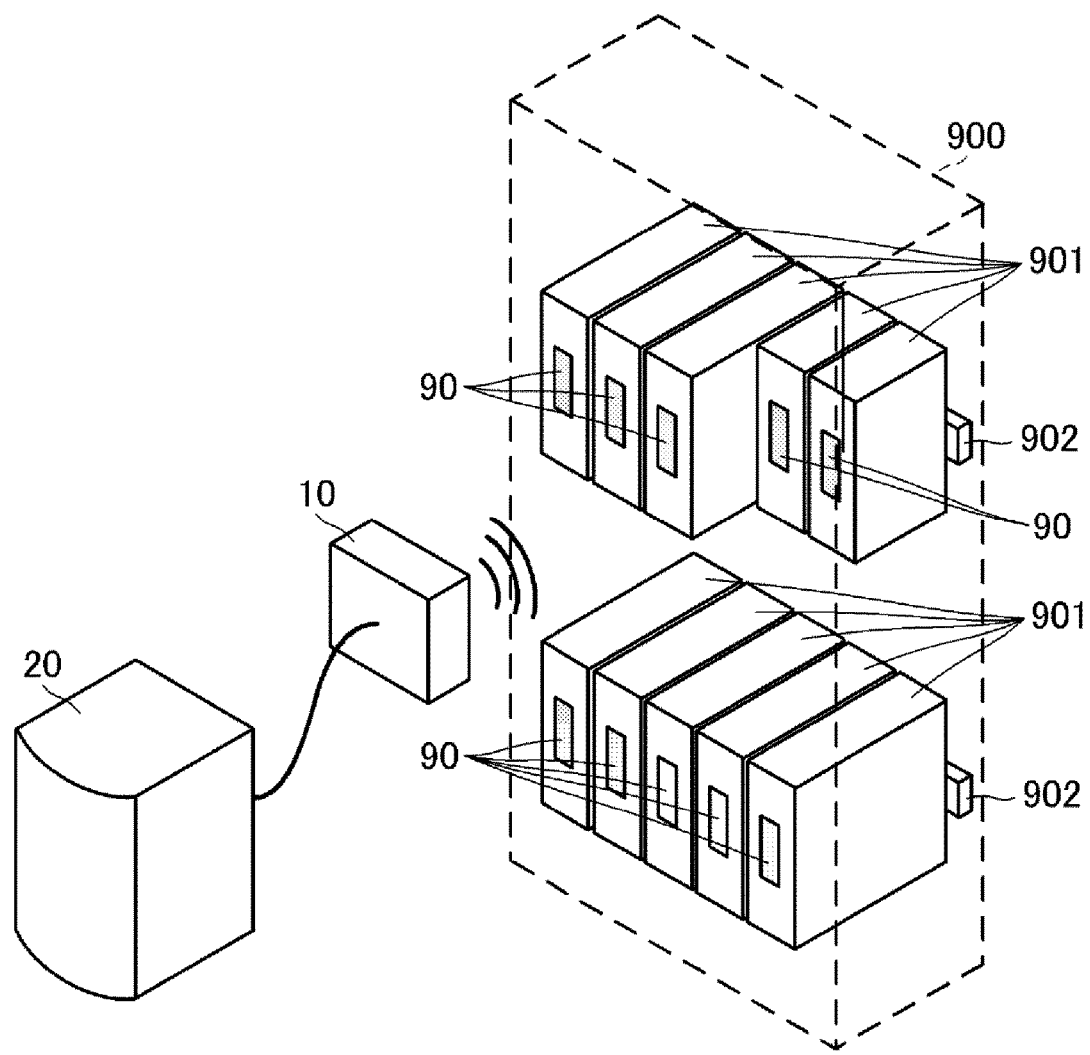
FIG. 2 is a schematic configuration diagram of a system including an RFID data management device according to an embodiment of the disclosure.

An RFID data management technology according to a first embodiment of the disclosure will be described with reference to the drawings. FIG. 1 is a diagram illustrating functional blocks of an RFID data management device according to the first embodiment of the disclosure. FIG. 2 is a schematic configuration diagram of a system including the RFID data management device according to the embodiment of the disclosure.

As illustrated in FIG. 1, the RFID data management device 10 includes a wireless communication unit 11, an RFID data acquisition unit 12, a communication unit 13, a relevant data acquisition unit 14, a remaining time calculation unit 15, a determination unit 16, and a notification unit 17. The RFID data management device 10 is, for example, an RFID reader and writer, and wirelessly communicates with an RFID 90, as illustrated in FIGS. 1 and 2. Further, as illustrated in FIGS. 1 and 2, the RFID data management device 10 is connected to a system server 20 over a communication network.

As illustrated in FIG. 2, the RFID 90 is mounted on control equipment 901 for factory automation (FA) arranged in the manufacturing line. The control equipment 901 is fixed to the control apparatus 900 via a guide rail 902. In the manufacturing line, an environmental temperature may be higher than a normal temperature and is, for example, an environmental temperature exceeding about 50° C. Therefore, the environmental temperature of the RFID 90 may be a high temperature of, for example, about 100° C.

Figures 3, 4:
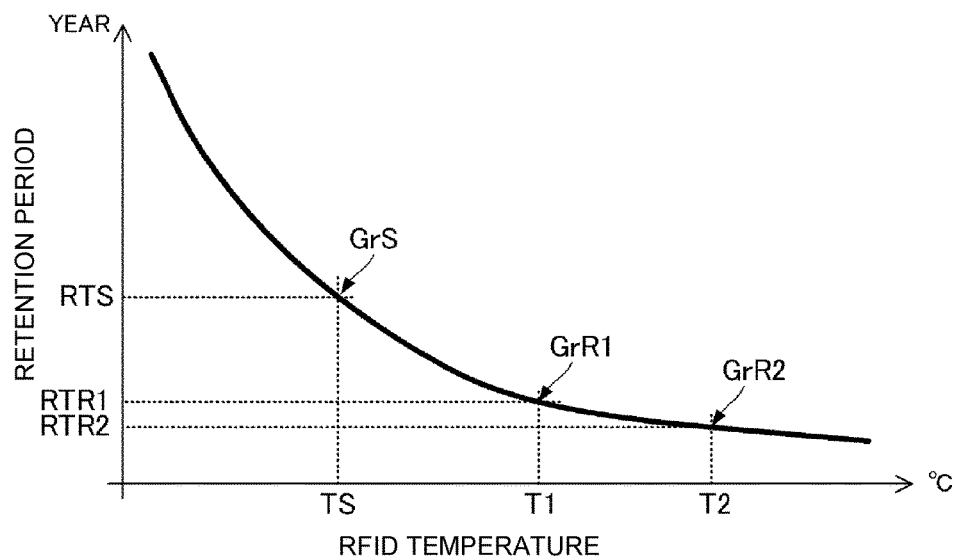
FIG. 3 is a graph illustrating an example of temperature dependence of a retention period.
FIG. 4 is a table illustrating an example of content of relevant data of an RFID.

There is a retention period in the RFID 90. The retention period is a time length in which newly stored data can be maintained without loss or change, and is a so-called data guarantee period. The retention period is determined for each type (for example, a model) of the RFID 90 in advance. Further, the retention period has temperature dependency as illustrated in FIG. 3. FIG. 3 is a graph illustrating an example of the temperature dependency of the retention period. In FIG. 3, a vertical axis indicates the retention period, and a horizontal axis indicates the environmental temperature of the RFID 90. The retention period has temperature dependence similarly regardless of the type of the RFID. As illustrated in FIG. 3, the retention period of the RFID 90 becomes shorter as the environmental temperature of the RFID 90 increases.

The wireless communication unit 11 of the RFID data management device 10 performs wireless communication with the RFID 90. The RFID data acquisition unit 12 acquires RFID management data transmitted from the RFID 90 through wireless communication. The RFID management data includes an identification number such as a serial number of the RFID 90.

The communication unit 13 performs data communication with the system server 20. The relevant data acquisition unit 14 acquires RFID relevant data transmitted from the system server 20 through data communication. FIG. 4 is a table illustrating an example of content of the relevant data of the RFID. As illustrated in FIG. 4, the RFID relevant data includes the identification number such as the serial number of the RFID 90, the type of the RFID 90, a manufacture date of the RFID 90, the number of past reads of the RFID 90, and an activation date of the RFID 90. The activation date is date on which the RFID data management device 10 initially performs transmission and reception to and from the RFID 90. Normally, the activation date is a use start date in an actual use environment of the RFID 90.

The remaining time calculation unit 15 acquires or calculates the retention period for each temperature from the RFID management data and the relevant data. The remaining time calculation unit 15 does not need to acquire or calculate the retention periods of all the temperatures, but acquires or calculates at least retention periods according to an environmental temperature at the time of storage of the RFID 90 and an environmental temperature at the time of use of the RFID 90.

Although the details will be described below, the remaining time calculation unit 15 calculates a remaining data guarantee time of the RFID 90 using the retention period and the environmental temperature at a data guarantee confirmation timing. In this case, when the data guarantee confirmation timing of the RFID 90 is after the use start timing of the RFID, the remaining time calculation unit 15 sets a first period and a second period and calculates the number of remaining days.

The determination unit 16 compares the number of remaining days with a rewriting determination threshold value. The rewriting determination threshold value is determined using the temperature and the retention period, and is set to a value a predetermined time (the number of days) before (for example, a few days earlier) the date and time at which the data is lost or changed on a time axis. When the determination unit 16 determines that the number of remaining days has reached the rewriting determination threshold value, the determination unit 16 executes rewriting of data to the RFID 90 via the wireless communication unit 11. When the determination unit 16 determines that the number of remaining days does not reach the rewriting determination threshold value, the determination unit 16 does not execute the rewriting process. Further, the determination unit 16 outputs the determination result to the notification unit 17. The notification unit 17 notifies the outside of the determination result through at least one type of an image, light emission, sound, and the like. Thus, a worker can recognize whether or not the data of the RFID 90 is rewritten.

Although an aspect in which the rewriting is automatically executed is shown herein, the rewriting may be executed after an operation is received from the worker.

Figure 5A:
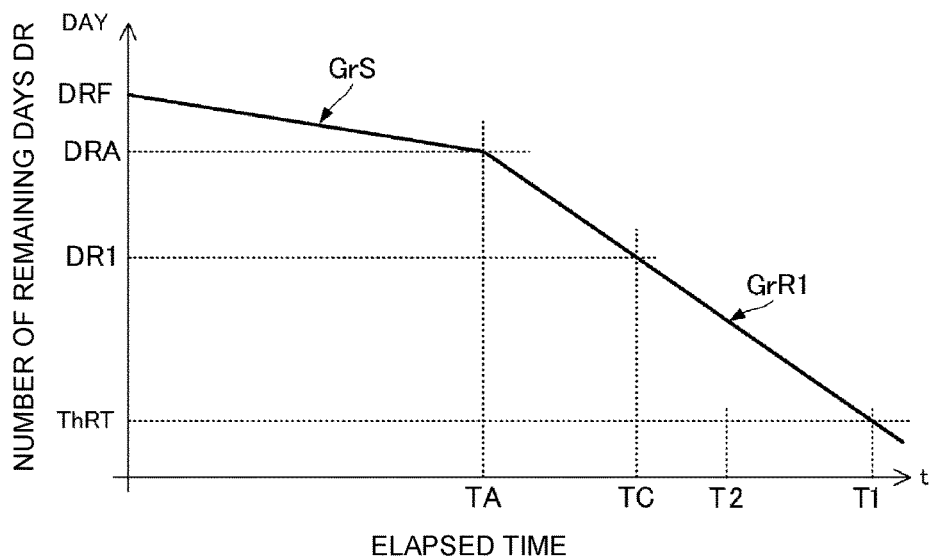
FIG. 5A and FIG. 5B are diagrams illustrating a concept of calculation of remaining days.
Figure 5B:
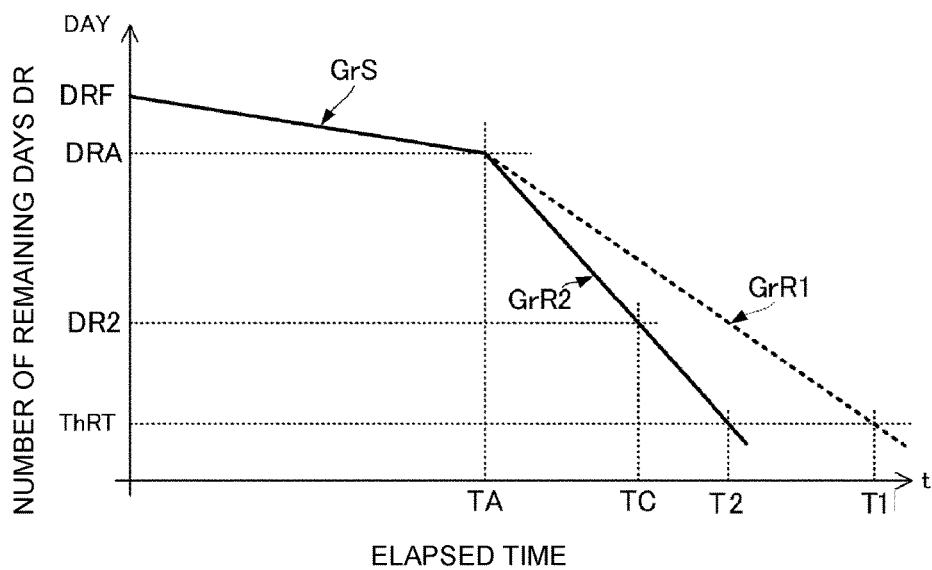

Next, a specific method of calculating the remaining days will be described with reference to FIG. 5A and FIG. 5B. FIG. 5A and FIG. 5B are diagrams illustrating a concept of calculation of remaining days. In FIG. 5A and FIG. 5B, a vertical axis indicates the number of remaining days DR and a horizontal axis indicates an elapsed time t. For the elapsed time t, a manufacturing date is set to 0. In FIG. 5A and FIG. 5B, an environmental temperature at the time of use is different, and an environmental temperature T2 of FIG. 5B is higher than an environmental temperature T1 of FIG. 5A.

(A) in the Case of the Environmental Temperature T1

As illustrated in FIG. 5A, the remaining time calculation unit 15 calculates a first number of remaining days in the first period, that is, the number of remaining days DRA on the activation date TA, using an environmental temperature TS (environmental temperature at the time of storage: for example 250° C.) in the first period and a reduction rate GrS (a first reduction rate) of the retention period according to this environmental temperature TS with reference to the manufacturing date in the first period. The reduction rate GrS can be calculated from a retention period RTS (see FIG. 3) at the environmental temperature TS.

The remaining time calculation unit 15 calculates a second number of remaining days in the second period using an environmental temperature T1 (actual use environmental temperature: for example 70° C.) in the second period and a reduction rate GrR1 (a second reduction rate) of the retention period according to this environmental temperature T1 with reference to the activation date TA. The reduction rate GrR1 can be calculated from a retention period RTR1 (see FIG. 3) at the environmental temperature T1. The reduction rate GrR1 is higher than the reduction rate GrS. That is, since the environmental temperature in the actual use period is higher than that in the storage period, the retention period becomes shorter. Using this process, correction of the calculation of the number of remaining days for shortening of the retention period due to such an increase in the environmental temperature can be accurately performed.

The remaining time calculation unit 15 calculates the number of remaining days DR1 of the RFID 90 by integrating the first number of remaining days and the second number of remaining days. Here, a method of individually calculating the first number of remaining days and the second number of remaining days is shown, but a function of the number of remaining days according to the reduction rates GrS and GrR1, the confirmation timing, the manufacturing date, and the activation date may be set and the number of remaining days may be calculated using the function.

Thus, the remaining time calculation unit 15 calculates the number of remaining days using respective retention periods even when there are a plurality of periods with different environmental temperatures, such as the storage period and the actual usage period. Thus, the number of remaining days can be accurately calculated.

For example, in the related art, the same retention period as in the actual use period is applied in the storage period, and the number of remaining days is calculated. In this case, the number of remaining days becomes smaller than the number of actual remaining days. However, the accurate number of remaining days can be calculated by using the configuration and process of the embodiment. Accordingly, it is possible to suppress an unnecessary increase in rewriting to the RFID 90.

(B) In the Case of the Environmental Temperature T2 (>T1)

As illustrated in FIG. 5B, the remaining time calculation unit 15 calculates a first number of remaining days in the first period, that is, the number of remaining days DRA on the activation date TA, using an environmental temperature TS (environmental temperature at the time of storage: for example 25° C.) in the first period and a reduction rate GrS (a first reduction rate) of the retention period according to this environmental temperature TS with reference to the manufacturing date in the first period. The reduction rate GrS can be calculated from a retention period RTS (see FIG. 3) at the environmental temperature TS.

The remaining time calculation unit 15 calculates a second number of remaining days in the second period using an environmental temperature T2 (actual use environmental temperature: for example 100° C.) in the second period and a reduction rate GrR2 (a second reduction rate) of the retention period according to this environmental temperature T2 with reference to the activation date TA. The reduction rate GrR2 can be calculated from a retention period RTR2 (see FIG. 3) at the environmental temperature T2. The reduction rate GrR2 is higher than the reduction rate GrR1. That is, since the environmental temperature in the actual use period of the environmental temperature T2 is higher than that in the actual use period of the environmental temperature T1, the retention period becomes shorter. Using this process, correction of the calculation of the number of remaining days for shortening of the retention period due to such a further increase in the environmental temperature can be accurately performed.

The remaining time calculation unit 15 calculates the number of remaining days DR2 (<DR1) of the RFID 90 by integrating the first number of remaining days and the second number of remaining days.

Thus, it is possible to accurately calculate the number of remaining days according to the environmental temperature of the actual use period by using the configuration and the process of the embodiment.

Although the aspect in which the respective environmental temperatures are appropriately set has been shown in the above description, a highest temperature in each environment may be set. Accordingly, a small number of remaining days according to the highest temperature is calculated. Therefore, rewriting and notification can be executed before a loss of or change in data.

Figure 6:
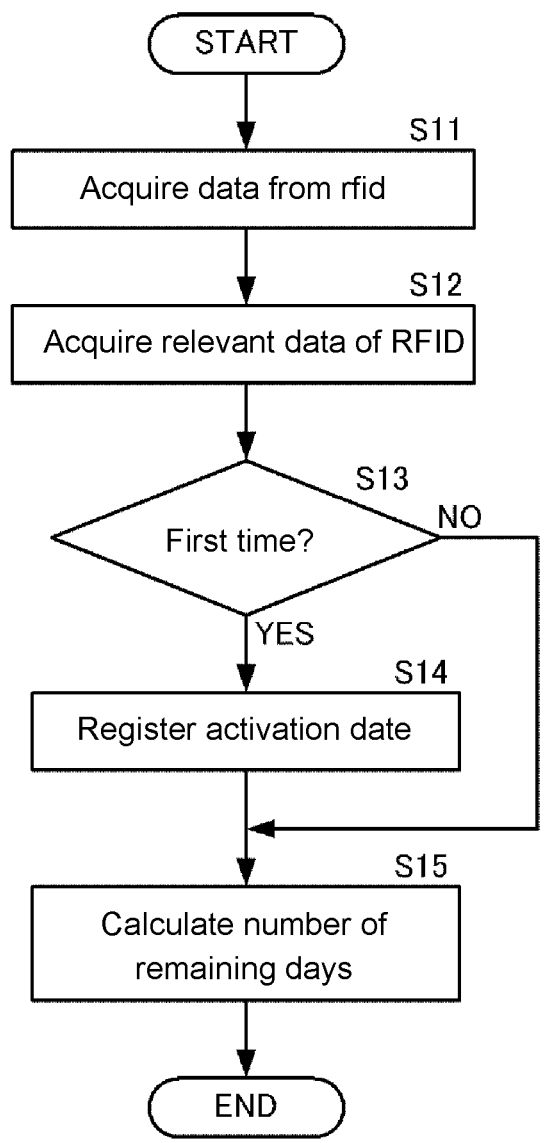
FIG. 6 is a flowchart of an RFID data management method according to the first embodiment of the disclosure.

The above-described process can be embodied as a program and also realized by executing the program in a data processing device such as a CPU. FIG. 6 is a flowchart illustrating an RFID data management method according to the first embodiment of the disclosure.

As illustrated in FIG. 6, the data processing device acquires the RFID management data from the RFID 90 (S11). Then, the data processing device acquires the relevant data of the RFID (S12).

When transmission and reception to and from the RFID 90 is the first time (S13: YES), the data processing device executes activation. The data processing device determines that the reading is the first time when the number of reads described above is zero, and determines that the reading is not the first time when the number of reads is not zero. In the case of the first time, the data processing device registers the activation date in the system server 20 (S14).

When the reading is the first time, the data processing device calculates the number of remaining days using only the environmental temperature of the storage period in the above method (S15). On the other hand, when the reading is not the first time (S13: NO), the data processing device distinguishes the above-described retention period from the retention period in the actual use time and calculates the number of remaining days (S15).

Figure 7:
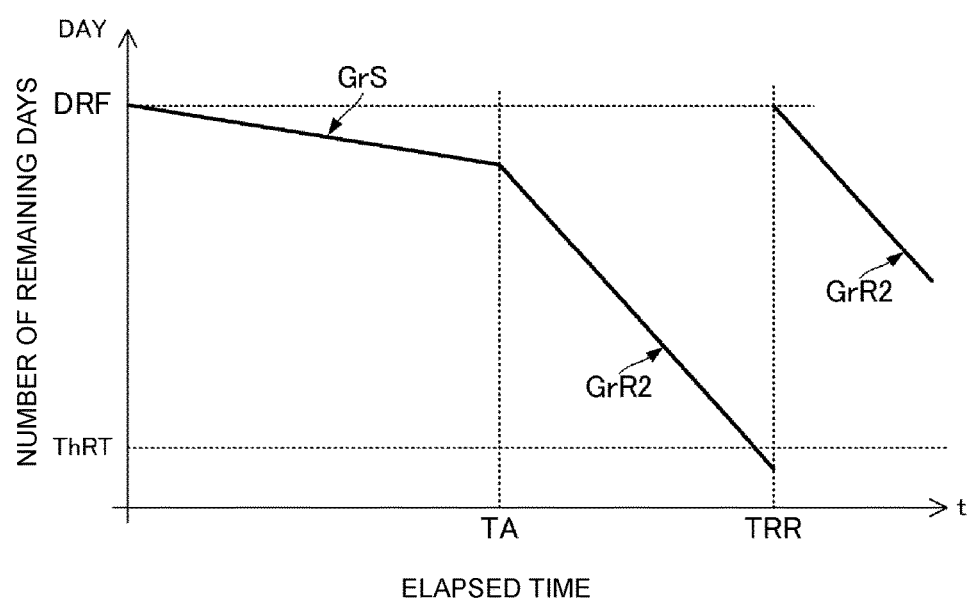
FIG. 7 is a diagram illustrating a concept of calculation of remaining days when rewriting is performed.

FIG. 7 is a diagram illustrating a concept of calculation of remaining days in the case of rewriting.

As illustrated in FIG. 7, when rewriting is performed, the RFID data management device 10 calculates the number of remaining days using the reduction rate of the retention period based on the environmental temperature in the actual use period with reference to rewriting date TRR.

Figure 8:
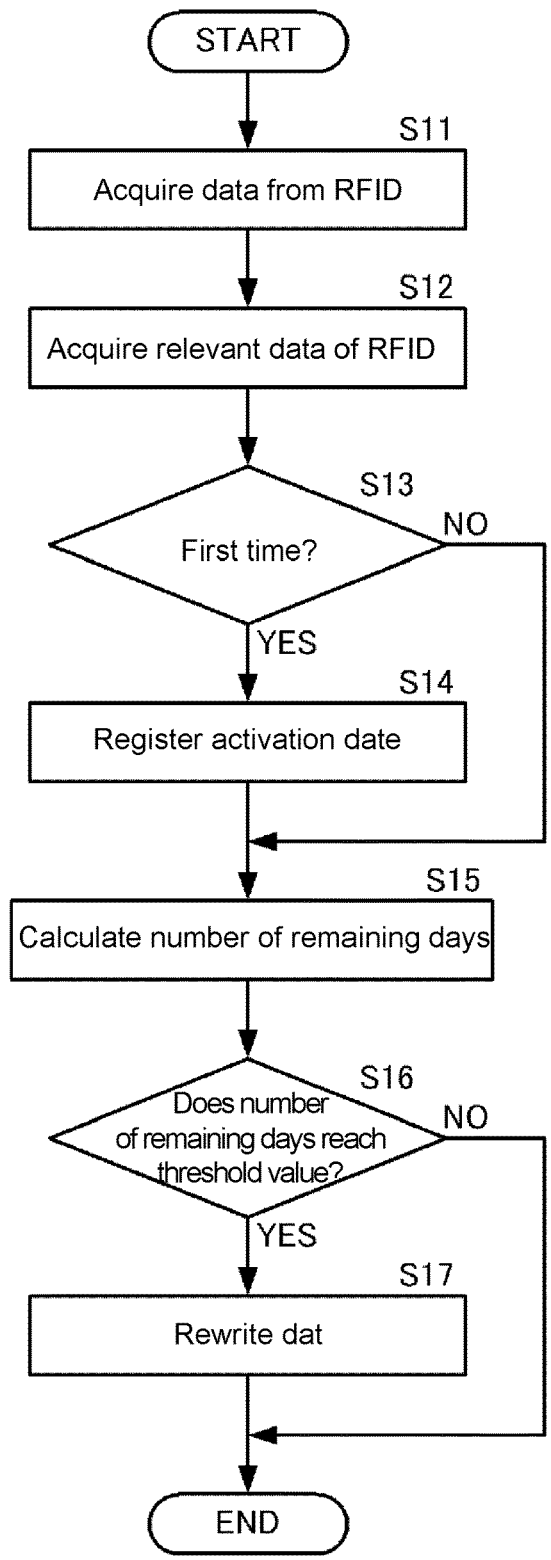
FIG. 8 is a flowchart of an RFID data management method when rewriting is automatically performed.

When the rewriting is automatically executed, the RFID data management device 10 may execute a process on the basis of a flowchart illustrated in FIG. 8. FIG. 8 is a flowchart of an RFID data management method when rewriting is automatically performed. The flowchart of FIG. 8 is the same as the flowchart of FIG. 6 up to step S15, and description of the same portions will be omitted.

The RFID data management device 10 stores a rewriting determination threshold value ThRT (see FIG. 5) for the number of remaining days. When the number of remaining days reaches the rewriting determination threshold value ThRT (S16: YES), the RFID data management device 10 (data processing device) executes rewriting of the RFID management data to the RFID 90 (S17). The RFID management data may be stored in the RFID 90 at the time of acquiring the RFID management data from the RFID 90. On the other hand, when the number of remaining days does not reach the rewriting determination threshold value ThRT (S16: NO), the RFID data management device 10 (data processing device) ends this process.

By executing such a rewriting process, the RFID 90 can reliably continue to hold accurate RFID management data.

Figure 9:
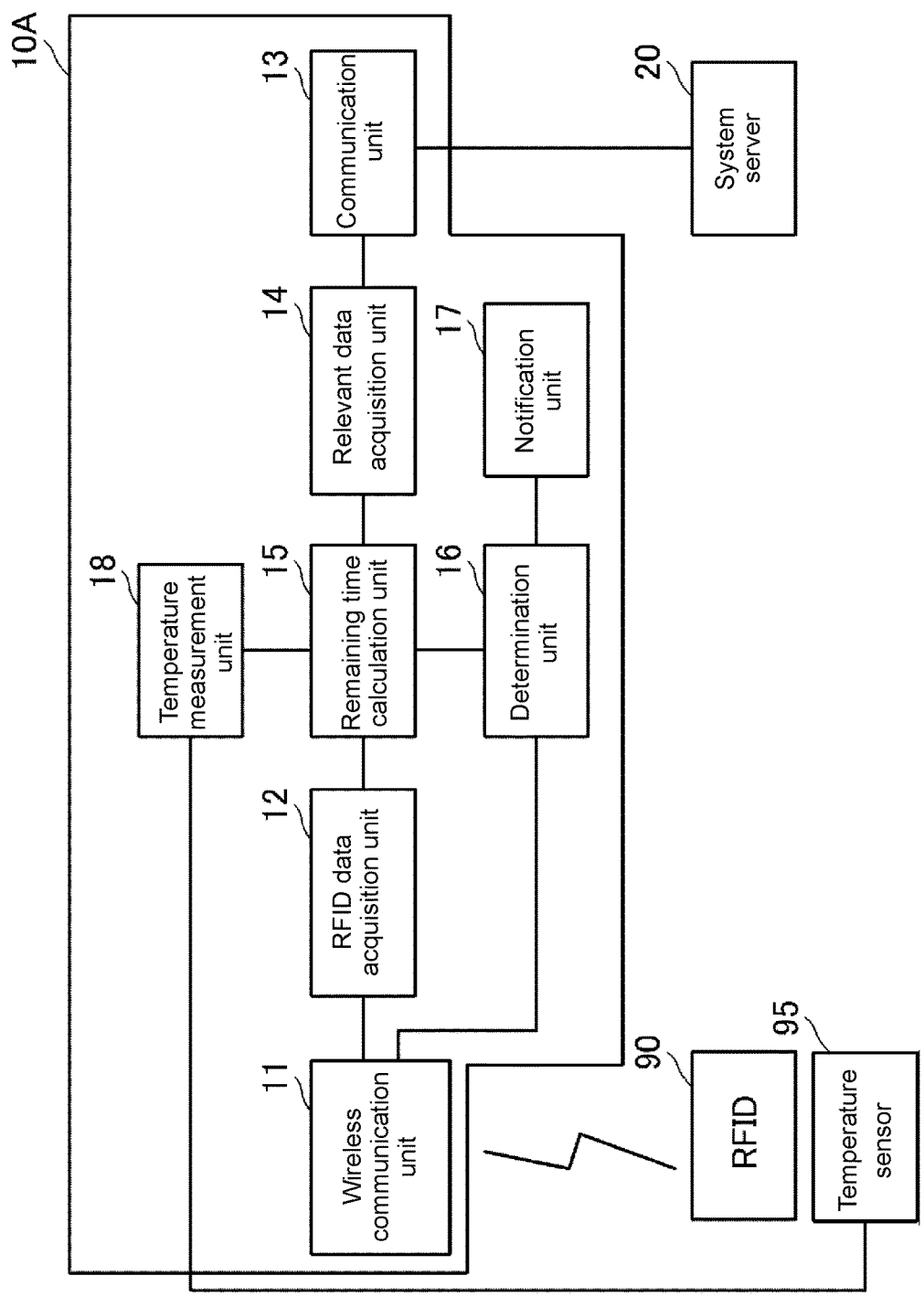
FIG. 9 is a diagram illustrating functional blocks of an RFID data management device according to a second embodiment of the disclosure.

Next, an RFID data management technology according to a second embodiment of the disclosure will be described with reference to the drawings. FIG. 9 is a diagram illustrating functional blocks of the RFID data management device according to the second embodiment of the disclosure. As illustrated in FIG. 9, an RFID data management device 10A according to the second embodiment is different from the RFID data management device 10 according to the first embodiment in that a temperature measurement unit 18 is added, and in a process of the remaining time calculation unit 15 due to this addition. Other configurations and processes of the RFID data management device 10A are the same as those of the RFID data management device 10, and description of the same portions will be omitted.

The temperature measurement unit 18 measures an environmental temperature of the RFID 90 from an output of a temperature sensor 95 attached to the RFID 90. The temperature measurement unit 18 outputs the measured environmental temperature to the remaining time calculation unit 15.

The remaining time calculation unit 15 calculates the number of remaining days using the above-described method using the measured environmental temperature.

With such a configuration and process, the RFID data management device 10A can calculate the number of remaining days more accurately.

Figure 10:
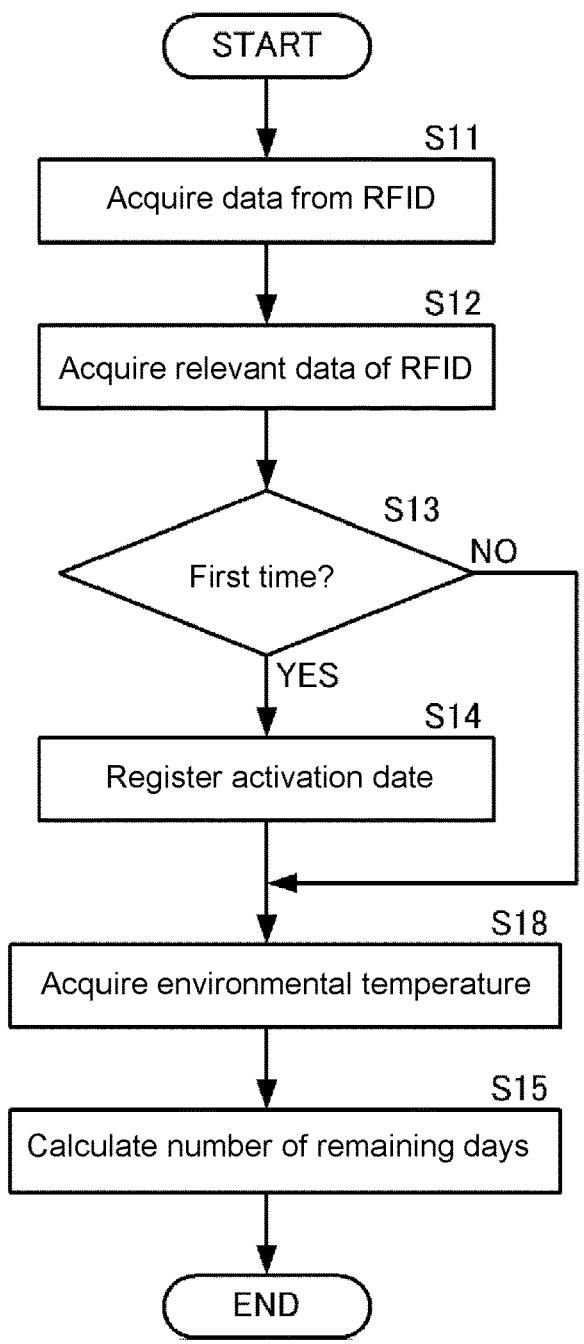
FIG. 10 is a flowchart of an RFID data management method according to the second embodiment of the disclosure.

When the temperature measurement unit 18 can acquire the environmental temperature of the RFID 90, the data processing device that realizes the RFID data management device 10A may store and execute next processes as a program. FIG. 10 is a flowchart of an RFID data management method according to the second embodiment of the disclosure. The flowchart of FIG. 10 is the same as the flowchart of FIG. 6 up to step S14, and description of the same portions will be omitted.

The RFID data management device 10A (data processing device) acquires the environmental temperature of the RFID 90 (S18). The RFID data management device 10A (data processing device) calculates the number of remaining days using the acquired environmental temperature (S15).

Although the aspect in which one RFID 90 is attached to the control equipment 901 which is a target article has been shown in the above description, a plurality of RFIDs 90 may be mounted. In this case, the RFIDs 90 may be mounted at positions at which environmental temperature is different. Accordingly, the number of remaining days is different for each RFID 90, and it is possible to reliably suppress a simultaneous loss of data and a simultaneous change in data in the plurality of RFIDs 90. An activation date and a rewriting date of the plurality of RFIDs 90 may be set so that the remaining days are different.

Further, although the aspect in which the number of remaining days is calculated using only the retention period has been shown in the above description, the number of remaining days may be calculated in additional consideration of aging deterioration. In this case, a degree of aging deterioration according to the environmental temperature may be set.

Further, a code in an image format in which the RFID management data is stored may be attached to the control equipment 901 (target article) on which the RFID 90 is mounted. Accordingly, by reading and rewriting the code in the image format, it is possible to perform rewriting reliably even when the data of the RFID 90 is lost or changed due to circumstances of emergency such as a sudden situation.

Further, the RFID data management device 10 or 10A or the system server 20 may store the RFID management data at the time of activation. Accordingly, it is possible to perform rewriting reliably even when the data of the RFID 90 is lost or changed due to circumstances of emergency such as a sudden situation.

The invention is not limited to each embodiment described above, various changes can be made in a range represented in the claims, and an embodiment acquired by appropriately combining technical means disclosed in different embodiments also belongs to the technical scope of the invention.

What is claimed is:

1. An RFID data management device comprising:
    an RFID data acquisition unit acquiring RFID management data comprising identification information of an RFID;
    a relevant data acquisition unit acquiring RFID relevant data comprising a use start date of the RFID; and
    a remaining time calculation unit calculating a remaining data guarantee time of the RFID using a data guarantee period dependent on the identification information and an environmental temperature of the RFID, and the environmental temperature,
    wherein the remaining time calculation unit calculates the remaining time by using
    the environmental temperature of the RFID in a first period from a manufacturing date of the RFID to a use start timing, and the data guarantee period according to the environmental temperature of the RFID in the first period, and
    the environmental temperature of the RFID in a second period from the use start timing to a timing of confirmation of the remaining data guarantee time, and the data guarantee period according to the environmental temperature of the RFID in the second period.

2. The RFID data management device according to claim 1,
    wherein the remaining time calculation unit calculates the remaining time using a reduction rate of the data guarantee period based on the environmental temperature.

3. The RFID data management device according to claim 2, comprising:
    a temperature measurement unit measuring the environmental temperature,
    wherein the remaining time calculation unit calculates the remaining time using the environmental temperature measured by the temperature measurement unit.

4. The RFID data management device according to claim 3, comprising:
    a determination unit performing a determination regarding rewriting of data of the RFID,
    wherein the determination unit compares the remaining time with a rewriting determination function to determine whether or not rewriting is necessary.

5. The RFID data management device according to claim 4, comprising:
    a rewriting execution unit executing rewriting of data to the RFID,
    wherein the rewriting execution unit executes rewriting of the data to the RFID when it is determined that the rewriting is necessary.

6. The RFID data management device according to claim 2,
    wherein the environmental temperature is a highest temperature according to each environment.

7. The RFID data management device according to claim 2, comprising:
    a determination unit performing a determination regarding rewriting of data of the RFID,
    wherein the determination unit compares the remaining time with a rewriting determination function to determine whether or not rewriting is necessary.

8. The RFID data management device according to claim 7, comprising:
    a rewriting execution unit executing rewriting of data to the RFID,
    wherein the rewriting execution unit executes rewriting of the data to the RFID when it is determined that the rewriting is necessary.

9. The RFID data management device according to claim 1, comprising:
    a temperature measurement unit measuring the environmental temperature,
    wherein the remaining time calculation unit calculates the remaining time using the environmental temperature measured by the temperature measurement unit.

10. The RFID data management device according to claim 9, comprising:
    a determination unit performing a determination regarding rewriting of data of the RFID,
    wherein the determination unit compares the remaining time with a rewriting determination function to determine whether or not rewriting is necessary.

11. The RFID data management device according to claim 10, comprising:
    a rewriting execution unit executing rewriting of data to the RFID,
    wherein the rewriting execution unit executes rewriting of the data to the RFID when it is determined that the rewriting is necessary.

12. The RFID data management device according to claim 1,
    wherein the environmental temperature is a highest temperature according to each environment.

13. The RFID data management device according to claim 1, comprising:
    a determination unit performing a determination regarding rewriting of data of the RFID,
    wherein the determination unit compares the remaining time with a rewriting determination function to determine whether or not rewriting is necessary.

14. The RFID data management device according to claim 13, comprising:
    a rewriting execution unit executing rewriting of data to the RFID,
    wherein the rewriting execution unit executes rewriting of the data to the RFID when it is determined that the rewriting is necessary.

15. An RFID data management method, comprising:
- an RFID data acquisition step of acquiring RFID management data comprising identification information of an RFID by a data processing device;
- a relevant data acquisition step of acquiring RFID relevant data comprising a use start date of the RFID by the data processing device; and
- a remaining time calculation step of calculating a remaining data guarantee time of the RFID using a data guarantee period dependent on the identification information and an environmental temperature of the RFID, and the environmental temperature by the data processing device,
- wherein the remaining time calculation step comprises calculating the remaining time by using
- the environmental temperature of the RFID in a first period from a manufacturing date of the RFID to a use start timing, and the data guarantee period according to the environmental temperature of the RFID in the first period, and
- the environmental temperature of the RFID in a second period from the use start timing to a timing of confirmation of the remaining data guarantee time, and the data guarantee period according to the environmental temperature of the RFID in the second period.

16. A non-transitory program product having a RFID data management program that causes a data processing device to execute a process comprising:
- an RFID data acquisition process of acquiring RFID management data comprising identification information of an RFID;
- a relevant data acquisition process of acquiring RFID relevant data comprising a use start date of the RFID; and
- a remaining time calculation process of calculating a remaining data guarantee time of the RFID using a data guarantee period dependent on the identification information and a environmental temperature of the RFID, and the environmental temperature,
- wherein, in the remaining time calculation process, the remaining time is calculated using
- the environmental temperature of the RFID in a first period from a manufacturing date of the RFID to a use start timing, and the data guarantee period according to the environmental temperature of the RFID in the first period, and
- the environmental temperature of the RFID in a second period from the use start timing to a timing of confirmation of the remaining data guarantee time, and the data guarantee period according to the environmental temperature of the RFID in the second period.

* * * * *